United States Patent
Conrad

(10) Patent No.: US 8,352,620 B2
(45) Date of Patent: Jan. 8, 2013

(54) DISPLAYING A NETWORK TOPOLOGY MAP WITH A REDUCED NUMBER OF OBJECTS

(75) Inventor: Jeffrey Richard Conrad, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 385 days.

(21) Appl. No.: 12/843,946

(22) Filed: Jul. 27, 2010

(65) Prior Publication Data

US 2012/0030363 A1 Feb. 2, 2012

(51) Int. Cl.
*G06F 15/16* (2006.01)

(52) U.S. Cl. ........ 709/228; 709/203; 709/220; 709/223; 707/755; 707/955; 707/999.103

(58) Field of Classification Search ............ 709/203, 709/220, 223, 228
See application file for complete search history.

(56) References Cited

U.S. PATENT DOCUMENTS

| | | | |
|---|---|---|---|
| 6,594,696 B1 | 7/2003 | Walker et al. | |
| 6,833,850 B1 | 12/2004 | Arquie et al. | |
| 6,880,127 B1 | 4/2005 | Arquie | |
| 7,310,774 B1 | 12/2007 | Arquie et al. | |
| 7,394,760 B1 * | 7/2008 | Nucci et al. | 370/225 |
| 7,453,824 B1 * | 11/2008 | Nucci et al. | 370/254 |
| 7,475,131 B2 | 1/2009 | Achiwa et al. | |
| 7,689,918 B2 | 3/2010 | Sauvageau | |
| 2012/0030363 A1 * | 2/2012 | Conrad | 709/228 |

\* cited by examiner

*Primary Examiner* — Michael Won

(57) ABSTRACT

Displaying a network topology map may include creating a database representing objects in a network; requesting a topology map of a certain type to represent at least a portion of the network; determining from the database a set of objects corresponding to the type of the requested map; determining parameters associated with the map type; and, while the cardinality of the set is above a threshold: presenting at least one of the parameters on a display, enabling a user to specify a value or group of values for the parameter, and reducing the cardinality of the set by removing objects not matching the value or group of values specified for the parameter.

20 Claims, 7 Drawing Sheets

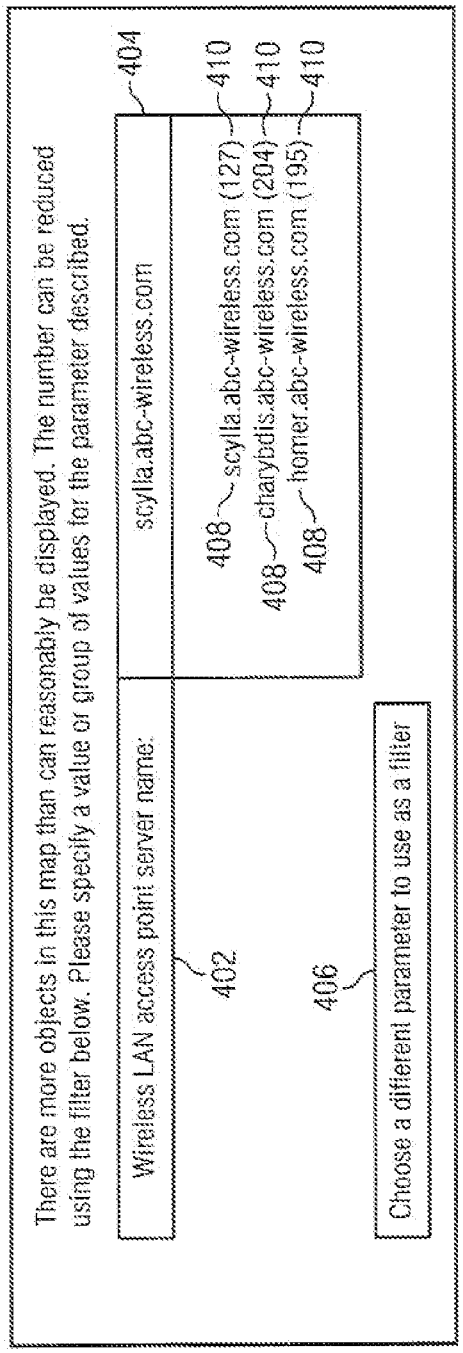

| MAP TYPE | PARAMETER LIST |
|---|---|
| GENERIC | NODE NAME, NODE STATUS, NUMBER OF INTERFACES, NUMBER OF IP ADDRESSES, PHYSICAL LOCATION, CUSTOMER SERVED BY A SERVICE RUNNING ON THE NODE, DEVICE TYPE, DEVICE FAMILY, DEVICE CATEGORY, DEVICE VENDOR |

*FIG. 7*

| MAP TYPE | PARAMETER LIST |
|---|---|
| WIRELESS LAN | WIRELESS LAN NAME, WIRELESS LAN CURRENTLY CONNECTED CLIENT SIZE, WIRELESS LAN ACCESS POINT SERVER NAME, WIRELESS LAN ACCESS POINT CLIENT NAME |

*FIG. 8*

| MAP TYPE | PARAMETER LIST |
|---|---|
| MPLS ROUTER | NUMBER OF HOPS FROM SELECTED NODE, VPN NAME, DEFINED NODE GROUP ID |

*FIG. 9*

| MAP TYPE | PARAMETER LIST |
|---|---|
| IP TELEPHONY | PHONE EXTENSION, ASSOCIATED CALL MANAGER |

*FIG. 10*

| MAP TYPE | PARAMETER LIST |
|---|---|
| NETWORK MULTICAST | MULTICAST FLOW ID |

*FIG. 11*

| MAP TYPE | PARAMETER LIST |
|---|---|
| NETWORK TRAFFIC | NETWORK TRAFFIC FLOW ID, VOLUME OF NETWORK TRAFFIC FLOW |

*FIG. 12*

| MAP TYPE | PARAMETER LIST |
|---|---|
| FRAME RELAY | FRAME RELAY CIRCUIT ID |

*FIG. 13*

| MAP TYPE | PARAMETER LIST |
|---|---|
| NETWORK ROUTERS | NUMBER OF LAYER 3 HOPS FROM SELECTED NODE, SUBNET ID, SUBNET SET ID, SUBNET PREFIX |

*FIG. 14*

| MAP TYPE | PARAMETER LIST |
|---|---|
| NETWORK SWITCHES | NUMBER OF LAYER 2 HOPS FROM SELECTED NODE, TYPE OF INTERFACE SUPPORTED, MAC ADDRESS FAMILY |

DISPLAYING A NETWORK TOPOLOGY MAP WITH A REDUCED NUMBER OF OBJECTS

BACKGROUND

In the context of managing or troubleshooting networks, such as data or communications networks for example, it is useful to visualize the various elements present in the network as well as the connectivity between the elements (hereinafter the "network topology"). Various tools are available for accomplishing this in one or more formats. According to one format, network elements may be presented in a table on a display. According to another format, network elements and the links between them may be presented graphically on a display in the form of a map that includes nodes and interconnecting links. Descriptive information about the nodes and/or the links typically is also presented on the display textually.

It is often the case in enterprise-class networks that the number of elements in a network of interest might number at least in the multiple thousands. Thus, presenting all the elements in the network on one display in either of the above formats can become impractical because of the large number of elements that need to appear simultaneously. Not only would such a display exceed the area and resolution capabilities of most display devices, but it would also exceed the ability of human users to meaningfully digest the information being presented.

BRIEF DESCRIPTION OF THE DRAWINGS

FIG. 4 illustrates an example user interface for presenting a parameter to a user according to embodiments of the invention.

FIG. 5 illustrates a further example, user interface for presenting a parameter to a user according to embodiments of the invention.

FIGS. 7-15 illustrate example lists of parameters that are relevant to specific problem domains, for storage in data provider modules according to embodiments of the invention.

DETAILED DESCRIPTION

Figure 1:
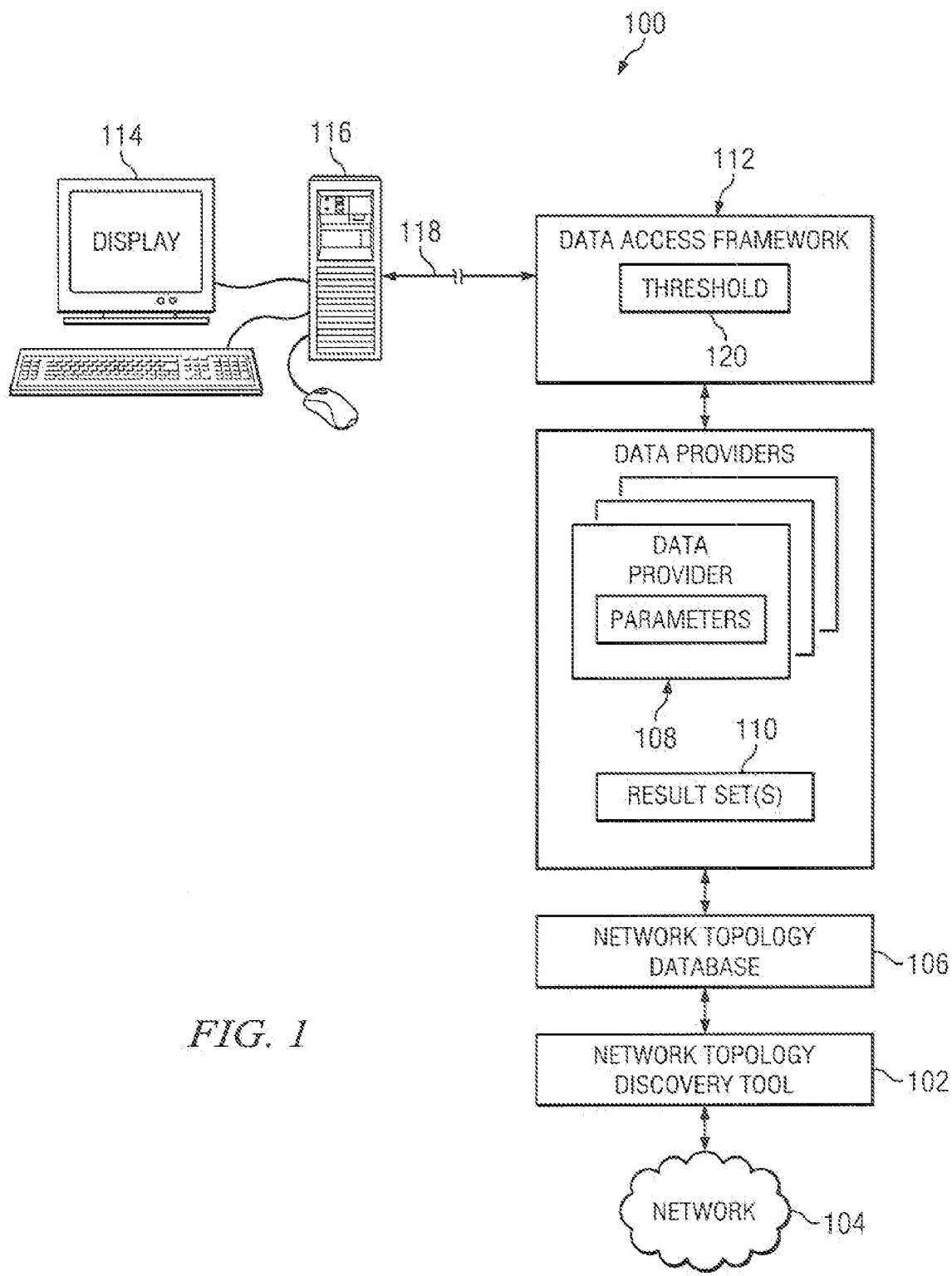
FIG. 1 is a block diagram illustrating an example class of systems for displaying a network topology according to embodiments of the invention.

FIG. 1 presents a system 100 for displaying a network topology map according to various example embodiments of the invention. A network topology discovery tool 102 may be used to determine the objects contained in a network 104 as well as the connections between the objects. Network 104 may be any kind of network, including for example data and/or communications networks. Topology discovery tool 102 may be conventional and can be implemented using known techniques and/or available products such as the NETWORK NODE MANAGER product available from the Hewlett-Packard Company. Once the topology of network 104 has been discovered, a network topology database 106 may be employed to contain information describing the topology, including for example descriptions of the objects contained in network 104 and the connections between them. The term "objects" as used herein may refer to any type of network component or node including without limitation routers, switches, wireless access points, bridges, storage devices, telephone devices, and general purpose computers such as desktop units, laptop units or servers and the like. The internal implementation of database 106 itself may take any form and may be conventional.

At least one data provider module 108 may be provided. For embodiments in which multiple data providers 108 are provided, each data provider 108 may be associated with a different problem domain. For example, a first data provider 108 may be specific to wireless LAN components in network 104, another data provider 108 may be specific to multiprotocol label switching ("MPLS") router components in the network, another data provider 108 may be specific to internet protocol ("IP") telephony components in the network, and so on. Each data provider 108 may have the ability, either individually or via a common set of utilities shared by all the data providers, to query topology database 108. The queries may return one or more result sets 110 containing descriptions of objects in the database whose parameter values match values specified by the query or fall within value groups or ranges specified by the query.

A data access framework 112 may also be provided. Data access framework is configured to receive result sets from data providers 108 and to present a topology map corresponding to the result set on one or more display devices such as display device 114. Display device 114 may be local to data access framework 112 or may be remote. In the illustration, display device 114 is shown attached to a workstation computer 116, which itself is connected to data access framework 112 in any fashion, such as by a wired or wireless network connection 118. Other arrangements such as mobile computing devices may also be used for coupling a suitable display device to access framework 112.

Any one of more of the various components of system 100 may be distributed across different computing, platforms in an enterprise, or they may be consolidated in a single computing platform depending on the application.

Figure 2:
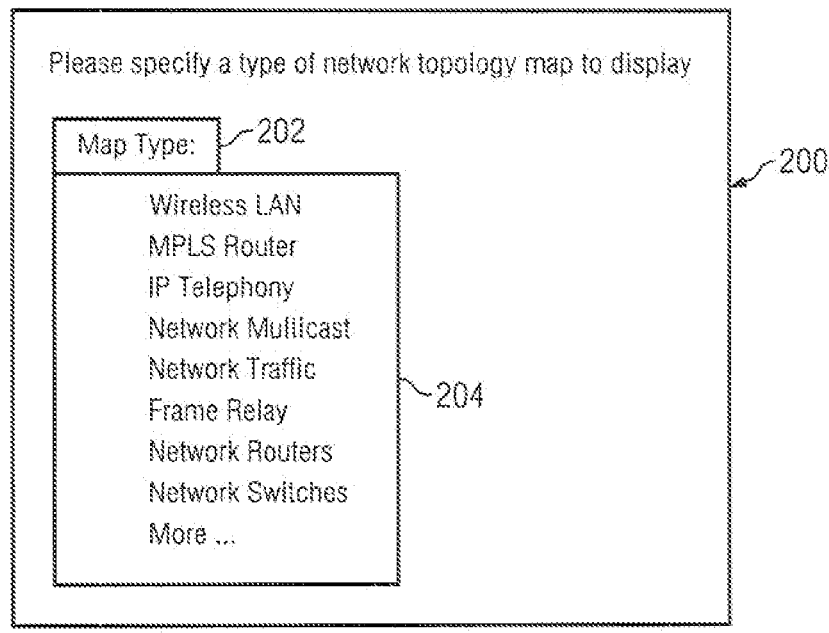
FIG. 2 illustrates an example user interface for enabling a user to request a network topology map having a certain type.

Data access framework 112 is configured to present a user interface on display 114 and to receive a user's request for a topology map having a certain type. For example, such a user interface might resemble interface 200 shown in FIG. 2. In interface 200, a map type 202 may be specified in any suitable manner. A list of choices 204 may be presented as well to guide the user in selecting map type 202.

In response to the user's request, framework 112 invokes a particular one of data providers 108 that corresponds to the selected map type. For example, if the user requested a wireless LAN map type, framework 112 would invoke a data provider 108 that is specific to wireless LAN data. Typically, framework 108 will specify to the data provider 108 a starting node and a maximum number of nodes to display. Either or both of these pieces of data may also be provided by the user. In addition, the maximum number of nodes to display may be stored as a threshold value 120. As persons skilled in the art will appreciate, not all topology types will require that a starting node be specified. The invoked data provider 108 is configured to query database 106 to retrieve a set 110 of objects to be displayed in response to the user's request. If the cardinality of the set 110 so obtained does not exceed threshold 120, framework 112 renders the requested topology map for presentation on display 114 according to known techniques. The term "cardinality" as used herein refers simply to the number of objects in the set that must be displayed.

Figure 3:
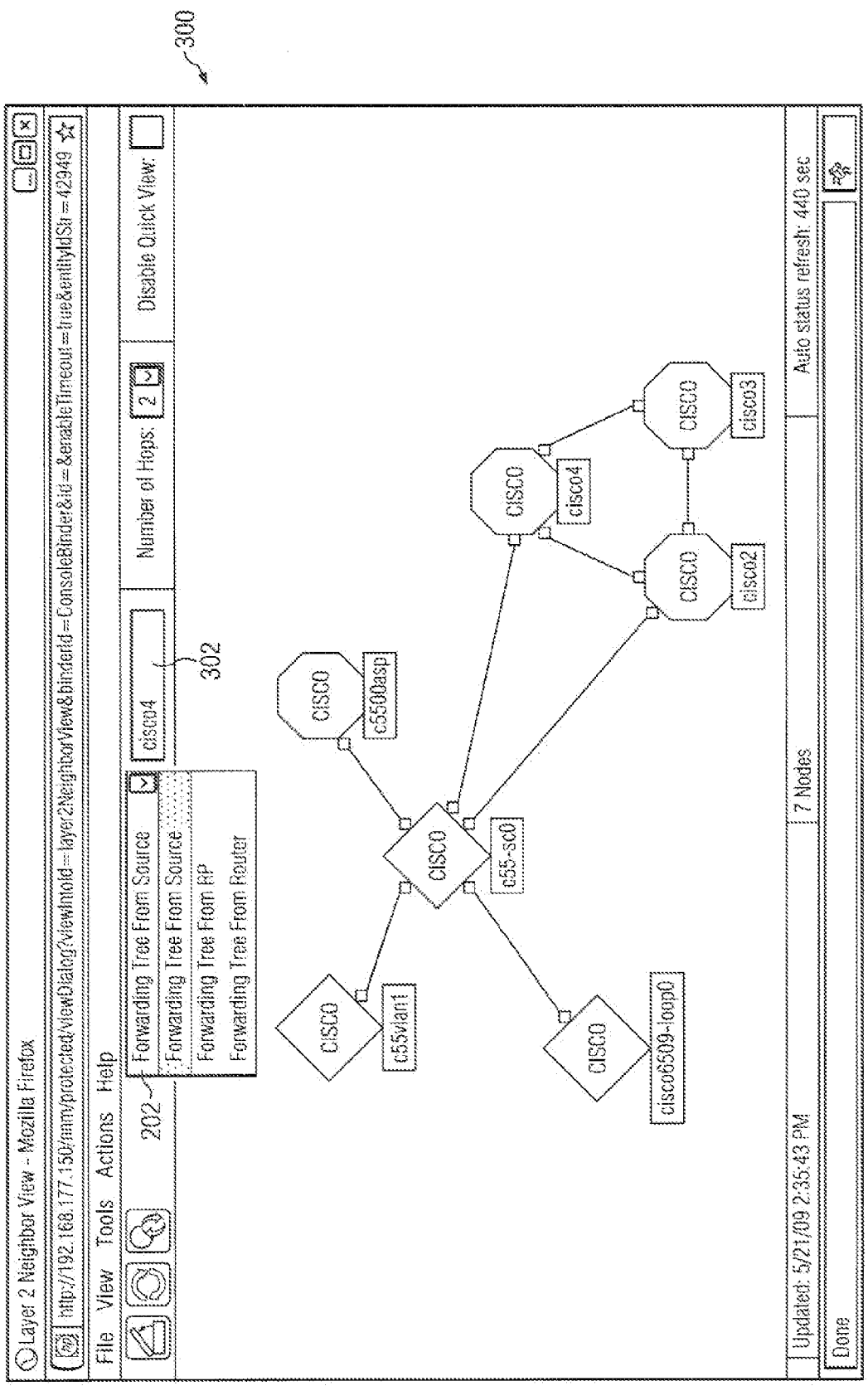
FIG. 3 illustrates an example network topology map being displayed.

Any suitable format may be used to display the topology map. For example, the display might resemble map 300 shown in FIG. 3. Map 300 also illustrates alternative example methods for presenting the user with choices about map type 202 and starting nodes 302. If appropriate, the topology map may be presented in a non-graphical form such as a list or table. Other formats may also be employed.

If the cardinality of set 110 exceeds threshold 120 then data provider 108 is configured to determine, based on actual contents of database 106, at least one parameter that may be used to reduce the cardinality of set 110. Data provider 108 communicates the parameter to framework 112. Framework 112 presents the parameter to the user via display 114 and invites the user to specify a value or group of values for the parameter for the purpose of making the set smaller. By way of example, framework 112 might present an interface resembling a window 400 shown in FIG. 400. Window 400 corresponds to a case in which the user had requested a wireless LAN map. The window displays a message indicating that the map requested contained too many objects to be reasonably displayed and invites the user to specify a value for a parameter 402 called "wireless LAN access point server name." In the example shown, a default value 404 is also presented to the user, the server name "scylla.abc-wireless.com." The user may also choose a different parameter to be used as a filter for making set 110 smaller, as shown at 406.

Once the user specifies a value or group of values for parameter 402, framework 112 communicates the specified value to data provider 108. Data provider 108 then uses the value to reduce the cardinality of set 110: It may do so, for example, by initiating a new query on database 106 to produce a new result set, or it may simply filter a previous result set 110 already obtained. If this filtering reduces the cardinality of set 110 below threshold 120, then the topology may be displayed as before.

If the cardinality of set 110 still exceeds threshold 120 even after applying the first parameter as a filter, then data provider 108 may present additional parameters to framework 112 to be used as filters for reducing the set further. Continuing the example of FIG. 4, data provider 108 might specify a second parameter to be used, "wireless LAN access point client name." Framework may present an interface resembling window 500 shown in FIG. 5. In window 500, the second parameter is described at 502, and the user is invited to specify a value or group of values for this parameter as well. As was the case in window 400, a default value may be pre-populated in the interface as shown, and the user may also select a different parameter to be used in lieu of parameter 502, as shown at 504. The user may specify a group of values using any appropriate technique, such as with the use of regular expressions. In the example of window 500, the string "*.shipping.pinnacle.com" captures any wireless LAN access point client names ending with ".shipping.pinnacle.com." Alternatively, a single value may be specified, such as "machine1.shipping.pinnacle.com." Once the user has specified a value for the second parameter, framework 112 communicates this to data provider 108 for use in reducing the size of set 110 as before. If the cardinality of the set is still not reduced below threshold 120, the process may repeat with additional parameters.

If desired, once the cardinality of set 110 has been reduced below threshold 120 using parameter filters, a variety of known algorithms may then be employed to increase the cardinality so that it is as close as possible to threshold 120. For example, nearest-neighbors of edge nodes may be included in breadth-first fashion to increase the cardinality beyond the filtered size.

In general any suitable user interface technique may be used to present the descriptions and parameters for filtering, as well as to receive the user's input. For example, the parameters and choices may be displayed using any combination of menus, drop-down lists, check boxes, radio buttons or text boxes.

In the example of window 500, the presenting of multiple parameters to reduce the size of set 110 is done sequentially. According to this technique, a value is specified for the first parameter presented, and the cardinality of set 110 is reduced accordingly, before any additional parameters are presented. As window 500 illustrates, previously-presented parameters 504 may presented again while presenting subsequent parameters 502. In this manner, the user may change the values previously entered for parameters 504 while specifying values for new parameters 502. Data provider 108 may then adjust data set 110 using the current parameter values in place of any values previously used. It may do so, for example, by initiating a fresh query on database 106. It is also possible to present the multiple parameters simultaneously instead of sequentially. This may be done using an interface similar to window 500, modified so that the user may specify values for all available or displayed parameters before the cardinality of set 110 is reduced in accordance with the values entered.

A number of mechanisms may be employed to determine the parameters to use as filters for reducing the cardinality of set 110. First, plural parameters 122 that relate to the relevant problem domain may be stored in each of data providers 108 in any appropriate data structure. A data provider 108 may then execute queries on database 106 to determine which one of its plural parameters 122 is capable of reducing the cardinality of set 110 more than other parameters in its list 122. Data provider 108 may then provide that parameter to framework 112 prior to or in lieu of the other parameters in its list 122. In this manner, the parameters to be presented for use as filters are chosen based on actual contents of database 106 and not necessarily in a predetermined manner. The result is a dynamic, intelligent process for reducing the number of objects to be displayed—a process that is optimized for the relevant problem domain and that takes the actual contents of network 104 into account.

A number of mechanisms may be used to accomplish the above. One such mechanism is for data provider 108 to determine actual values that occur in database 106 for one or more of the parameters in its list 122. For each of the actual values discovered, data provider 108 may determine what a resulting cardinality for set 110 would be if that actually-occurring value were assigned to the corresponding parameter. Data provider 108 may determine which parameter to present to framework 112 based on these results, for example by choosing to first present the parameter whose values yield the lowest cardinality numbers. Variations on this technique may also be employed.

In addition, when a parameter is presented to the user, the actually-occurring values 408 for the parameter may be displayed along with resulting cardinalities 410 for the actually-occurring values as shown in FIG. 4. This further guides the user in selecting appropriate parameter values to be used as filters for reducing set 110.

Figure 6:
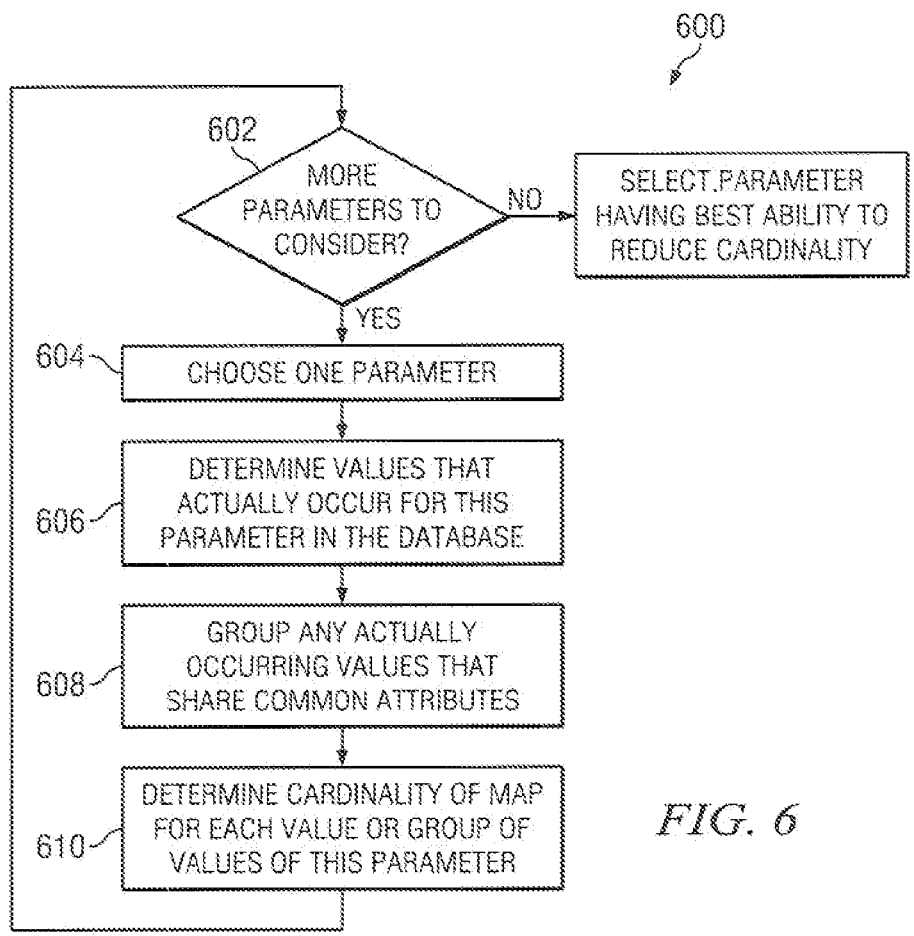
FIG. 6 is a flow diagram illustrating example methods according to embodiments of the invention for selecting a parameter to present to a user for the purpose of reducing the number of objects to display in a network topology map.

A general method 600 for accomplishing the above is illustrated in FIG. 6. Data provider 108 may consider the parameters in its list 122 one at a time as indicated at step 602. In steps 604 and 606, a parameter from list 122 is chosen and actually-occurring values for that parameter are determined. For parameter values that lend themselves to grouping, as in the case of strings corresponding to server names, the actually-occurring values may then be grouped according to shared attributes in step 608. This may be done using any known algorithms appropriate to the problem domain. For example, clustering algorithms may be used to associate like parameter values and to determine a range of values describing the cluster. In addition, known algorithms may be used to find commonly-occurring string subsets among groups of strings. The output of such processes may be a list of actually-occurring values represented as regular expressions as shown in FIG. 5. In step 610, cardinalities 410, 508 may be determined for each actually-occurring value or identified group of values. Once all parameters in list 122 have been considered, in step 612 data provider 108 may then select one of the parameters having the best ability to reduce the cardinality of set 110. As was mentioned above, any suitable criteria may be used to make the latter determination.

A series of examples will now be presented to illustrate that a wide variety of domain-specific or generic data providers 108 may be provided in a system 100, each with a different list 122 of domain-specific or generic parameters.

A data provider 108 corresponding to a generic map type may be provided with a list of parameters 700 as shown in FIG. 7. The list may include without limitation, for example, any one or more parameters chosen from the group consisting of: node name, node status, number of interfaces, number of IP addresses, physical location, customer served by a service running on the node, device type, device family, device category, and device vendor.

A data provider 108 corresponding to a wireless LAN map type may be provided with a list of parameters 800 as shown in FIG. 8. The list may include without limitation, for example, any one or more parameters chosen from the group consisting of: wireless LAN name, wireless LAN currently connected client size, wireless LAN access point server name, and wireless LAN access point client name.

A data provider 108 corresponding to an MPLS router map type may be provided with a list of parameters 900 as shown in FIG. 9. The list may include without limitation, for example, any one or more parameters chosen from the group consisting of: number of hops from a selected node, virtual private network ("VPN") name, and the identifier ("ID") of a defined node group.

A data provider 108 corresponding to an IP telephony map type may be provided with a list of parameters 1000 as shown in FIG. 10. The list may include without limitation, for example, any one or more parameters chosen from the group consisting of phone extension, and associated call manager.

A data provider 108 corresponding to a network multicast map type may be provided with a list of parameters 1100 as shown in FIG. 11. The list may include without limitation, for example, multicast flow ID.

A data provider 108 corresponding to a network traffic map type may be provided with a list of parameters 1200 as shown in FIG. 12. The list may include without limitation, for example, any one or more parameters chosen from the group consisting of: network traffic flow ID, and volume of network traffic flow.

A data provider 108 corresponding to a frame relay map type may be provided with a list of parameters 1300 as shown in FIG. 13. The list may include without limitation, for example, frame relay circuit ID.

A data provider 108 corresponding to a network router map type may be provided with a list of parameters 1400 as shown in FIG. 14. The list may include without limitation, for example, any one or more parameters chosen from the group consisting of: number of layer 3 (e.g., IP layer) hops from a selected node, subnet ID, subnet set ID, and subnet prefix.

A data provider 108 corresponding to a network switch map type may be provided with a list of parameters 1500 as shown in FIG. 15. The list may include without limitation, for example, any one or more parameters chosen from the group consisting of: number of layer 2 (e.g. ethernet layer) hops from a selected node, type of interface supported, and media access control ("MAC") address family.

Other data providers 108 may be provided for other problem domains as well.

Figure 16:
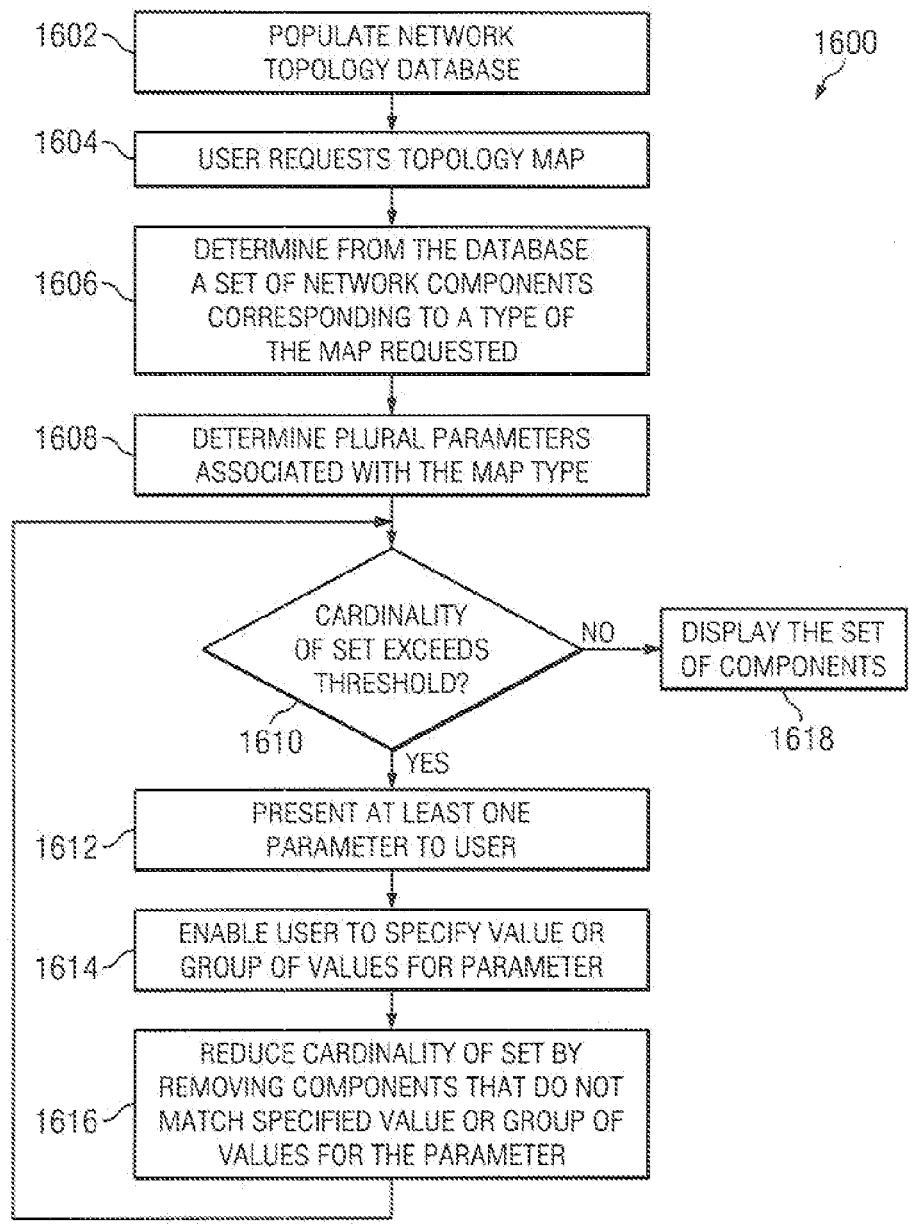
FIG. 16 is a flow diagram illustrating example methods for displaying a network topology map according to embodiments of the invention.

Embodiments of the invention need not be limited to systems such as system 100. Rather, embodiments may also be described in method form as in method 1600 shown in FIG. 16. In step 1602 of method 1600, a network topology database is populated with information about the objects contained in a network. In step 1604, a user requests a topology map. In step 1606, the database is used to determine a set of network components corresponding to the type of the map requested. In step 1608, plural parameters associated with the map type are determined. A set of objects from the database that correspond to the map type is identified. If the cardinality of the set does not exceed a threshold, then a topology map representing the objects in the set may be displayed without more, as in steps 1610 and 1618. But if the cardinality exceeds the threshold, then in step 1612 at least one parameter is presented to the user to be used as a filter for reducing the set size. In step 1614, the user specifies a value or group of values for the parameter. And in step 1616, the set size is reduced by removing objects from the set that do not match the specified value or group of values for the parameter. The process may be repeated at step 1610 if necessary to reduce the set size below the threshold.

Figure 17:
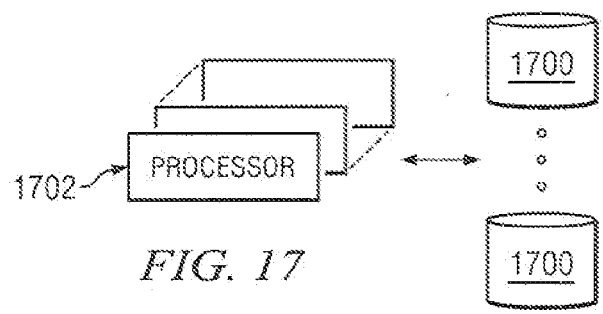
FIG. 17 is a block diagram illustrating processors and computer-readable storage media suitable for use with embodiments of the invention.

Embodiments of the invention also may include one or more tangible machine-readable storage media 1700 that contain instructions for execution on one or more processors 1702 (see FIG. 17). The instructions, when executed, cause the one or more processors to implement the behaviors described above. Any one or more of processors 1702 and storage media 1700 may be distributed across multiple computing platforms and locations, or they may be co-located on a single platform. In addition, storage media 1700 may be located at a server so that the instructions may be downloaded to a consumer computing platform via a network. Storage media 1700 may take any conventional form such as, for example, magnetic disks, optical disks, flash memory, static or dynamic random access memory ("RAM") and the like.

While the invention has been described in detail with reference to certain embodiments thereof, the described embodiments have been presented by way of example and not by way of limitation. It will be understood by those skilled in the art and having reference to this specification that various changes may be made in the form and details of the described embodiments without deviating from the spirit and scope of the invention as defined by the appended claims.

What is claimed is:

1. A computer-implemented method of displaying a network topology map, comprising:
   creating a database representing objects in a network;

requesting, by a user, a topology map to represent at least a portion of the network, the topology map having a map type;
determining from the database a set of objects corresponding to the map type;
determining plural parameters associated with the map type;
while the cardinality of the set is above a threshold:
presenting at least one of the parameters to the user on a display, enabling the user to specify a value or group of values for the at least one parameter, and reducing the cardinality of the set by removing objects not matching the value or group of values specified for that parameter; and
displaying the set of objects.

2. The method of claim 1, wherein presenting at least one of the parameters comprises:
presenting the plural parameters sequentially such that a value or group of values is specified for a parameter currently being presented, and the cardinality of the set is reduced accordingly, prior to presenting a next parameter.

3. The method of claim 1, wherein presenting at least one of the parameters comprises:
presenting the plural parameters simultaneously such that a value or group of values may be specified for each of the plural parameters before the cardinality of the set is reduced in accordance with the values or groups of values specified.

4. The method of claim 1, wherein presenting at least one of the parameters comprises:
from among the plural parameters, and taking actual contents of the database into account, determining one parameter that when given a value or range or values is capable of reducing the cardinality of the set more than another parameter; and
presenting the one parameter prior to or in lieu of the other parameter.

5. The method of claim 2, wherein presenting the plural parameters sequentially comprises:
including previously-presented parameters on the display when displaying each subsequent parameter; and
enabling the user to change previously-specified values or groups of values for the previously-presented parameters when specifying a value or group of values for a newly-resented parameter; and
taking all currently-specified values or groups of values into account when reducing the cardinality of the set.

6. The method of claim 1, wherein presenting at least one of the parameters comprises:
for the at least one parameter, determining actual values that occur among objects represented in the database;
for each of the actual values, determining what a resulting cardinality of the set would be if that value were specified for the at least one parameter; and
displaying the actual values and the resulting cardinalities along with the at least one parameter.

7. The method of claim 1, wherein presenting at least one of the parameters comprises:
displaying a description of the at least one parameter; and
displaying at least one of a menu, drop-down list, check box, radio button or text box to receive the user's specification of the value or group of values for the at least one parameter.

8. The method of claim 1, wherein reducing the cardinality of the set comprises:
querying the database or filtering a result set from a previous query of the database.

9. The method of claim 1, wherein determining plural parameters associated with the map type comprises:
providing plural data provider modules, each specific to a different problem domain and storing a list of parameters that are relevant to that problem domain; and
invoking one of the plural data provider modules responsive to the map type.

10. The method of claim 1, wherein:
the plural parameters comprise at least one parameter taken from the following group: node name, node status, number of interfaces, number of IP addresses, physical location, customer served by a service running on the node, device type, device family, device category, and device vendor.

11. The method of claim 1, wherein:
the map type is a wireless LAN map; and
the plural parameters comprise at least one parameter taken from the following group: LAN name, LAN currently connected client size, LAN access point server name, and LAN access point client name.

12. The method of claim 1, wherein:
the map type is an MPLS router map; and
the plural parameters comprise at least one parameter taken from the following group: number of hops from a selected node, VPN name, and a predefined node group of routers.

13. The method of claim 1, wherein:
the map type is an IP telephony map; and
the plural parameters comprise at least one parameter taken from the following group: telephone extension, and associated call manager.

14. The method of claim 1, wherein:
the map type is a network multicast map; and
the plural parameters comprise multicast flow ID.

15. The method of claim 1, wherein:
the map type is a network traffic map; and
the plural parameters comprise at least one parameter taken from the following group: network traffic flow ID, and volume of network traffic flow.

16. The method of claim 1, wherein:
the map type is a frame relay map; and
the plural parameters comprise frame relay circuit ID.

17. The method of claim 1, wherein:
the map type is a network routers map; and
the plural parameters comprise at least one parameter taken from the following group: number of layer 3 hops from a selected node, subnet ID, set of subnet IDs, and subnet prefix.

18. The method of claim 1, wherein:
the map type is a network switches map; and
the plural parameters comprise at least one parameter taken from the following group: number of layer 2 hops from a selected node, type of interface supported, and MAC address family.

19. A system for displaying a network topology map, comprising:
a network topology database for containing information that describes objects in a network;
plural data providers, each associated with a different problem domain; and
a data access framework; wherein:
the framework is configured to receive a user's request for the topology map and to invoke one of the data providers whose problem domain relates to a type of the topology map requested;

the invoked data provider is configured to obtain, from the database, indications about a set of objects to be displayed in response to the request and, if the cardinality of the set exceeds a threshold, to determine based on actual contents of the database at least one parameter for reducing the cardinality of the set, and to communicate the at least one parameter to the framework;

the framework is configured to present the at least one parameter to the user and to receive from the user a specification of a value or group of values for the at least one parameter;

the invoked data provider is configured to reduce the cardinality of the set based on the specified value or group of values, and to communicate the set to the framework; and the framework is configured to display the topology map based on the set of objects.

20. At least one non-transitory computer-readable data storage medium containing instructions that, when executed by at least one processor, cause the at least one processor to perform a method comprising:

receiving a user request for a topology map representing at least a portion of a network;

querying a database to determine a set of objects in the network that correspond to the request;

determining that a cardinality of the set exceeds a threshold;

identifying, based on a type of the topology map requested and based on actual contents of the database, at least one parameter for reducing the cardinality of the set;

enabling the user to specify a value or group of values for the at least one parameter;

reducing the cardinality of the set by removing objects from the set that do not match the specified value or group of values; and displaying the topology map using the set.

\* \* \* \* \*

UNITED STATES PATENT AND TRADEMARK OFFICE
CERTIFICATE OF CORRECTION

PATENT NO. : 8,352,620 B2  Page 1 of 1
APPLICATION NO. : 12/843946
DATED : January 8, 2013
INVENTOR(S) : Jeffrey Richard Conrad It is certified that error appears in the above-identified patent and that said Letters Patent is hereby corrected as shown below:

In column 7, line 35, in Claim 4, after "range" delete "or" and insert -- of --, therefor.

Signed and Sealed this
Second Day of April, 2013

Teresa Stanek Rea
*Acting Director of the United States Patent and Trademark Office*